US011889267B2

(12) United States Patent
Denda et al.

(10) Patent No.: US 11,889,267 B2
(45) Date of Patent: Jan. 30, 2024

(54) NOISE CANCELLATION ENABLED AUDIO SYSTEM AND METHOD FOR ADJUSTING A TARGET TRANSFER FUNCTION OF A NOISE CANCELLATION ENABLED AUDIO SYSTEM

(71) Applicant: ams AG, Premstätten (AT)

(72) Inventors: Martin Denda, Premstätten (AT); Martin Schörkmaier, Premstätten (AT); Philipp Hack, Premstätten (AT); Siegfried Selberherr, Premstätten (AT)

(73) Assignee: AMS AG, Premstätten (AT)

( * ) Notice: Subject to any disclaimer, the term of this patent is extended or adjusted under 35 U.S.C. 154(b) by 376 days.

(21) Appl. No.: 17/424,589

(22) PCT Filed: Jan. 23, 2020

(86) PCT No.: PCT/EP2020/051624
§ 371 (c)(1),
(2) Date: Jul. 21, 2021

(87) PCT Pub. No.: WO2020/152268
PCT Pub. Date: Jul. 30, 2020

(65) Prior Publication Data

US 2022/0086574 A1 Mar. 17, 2022

(30) Foreign Application Priority Data

Jan. 25, 2019 (EP) .................................... 19153794

(51) Int. Cl.
*H04R 25/00* (2006.01)
*H04R 1/10* (2006.01)

(52) U.S. Cl.
CPC ......... *H04R 25/505* (2013.01); *H04R 1/1083* (2013.01); *H04R 25/353* (2013.01);
(Continued)

(58) Field of Classification Search
CPC .. H04R 1/1083; H04R 25/353; H04R 25/505; H04R 25/558; H04R 25/75; H04R 2225/43; H04R 2460/01
See application file for complete search history.

(56) References Cited

U.S. PATENT DOCUMENTS 9,712,933 B2 * 7/2017 Pontoppidan ........ H04R 25/558
2011/0046435 A1 * 2/2011 Jensen ................ H04R 25/505
600/28

(Continued)

FOREIGN PATENT DOCUMENTS

CN 107211205 A 9/2017
DE 102011001793 A1 10/2012

(Continued)

OTHER PUBLICATIONS

Wikipedia, "System on a chip", Jan. 15, 2019; https://en.wikipedia.org/w/index.php?title=Systemonachip&oldid=878579427, 13 pages.

(Continued)

*Primary Examiner* — Huyen D Le
(74) *Attorney, Agent, or Firm* — MH2 TECHNOLOGY LAW GROUP LLP

(57) ABSTRACT

A noise cancellation enabled audio system for tonal tinnitus treatment using ambient noise comprises an audio processor (PROC) and at least one filter having an adjustable filter function. An ear mountable playback device (HP) further comprises a speaker (SP) and at least one feedforward microphone (FF_MIC). The audio processor (PROC) is configured to receive an input signal (Z(s)) from the feedforward microphone (FF_MIC) indicative of ambient noise and determine a filter transfer function (HF(s)) to realize a predetermined target transfer function (HT(s)), wherein the target transfer function (HT(s)) is configured to attenuate and/or amplify the input signal (Z(s)) in a predetermined frequency range. The filter function is adjusted depending on
(Continued)

Figure 1:
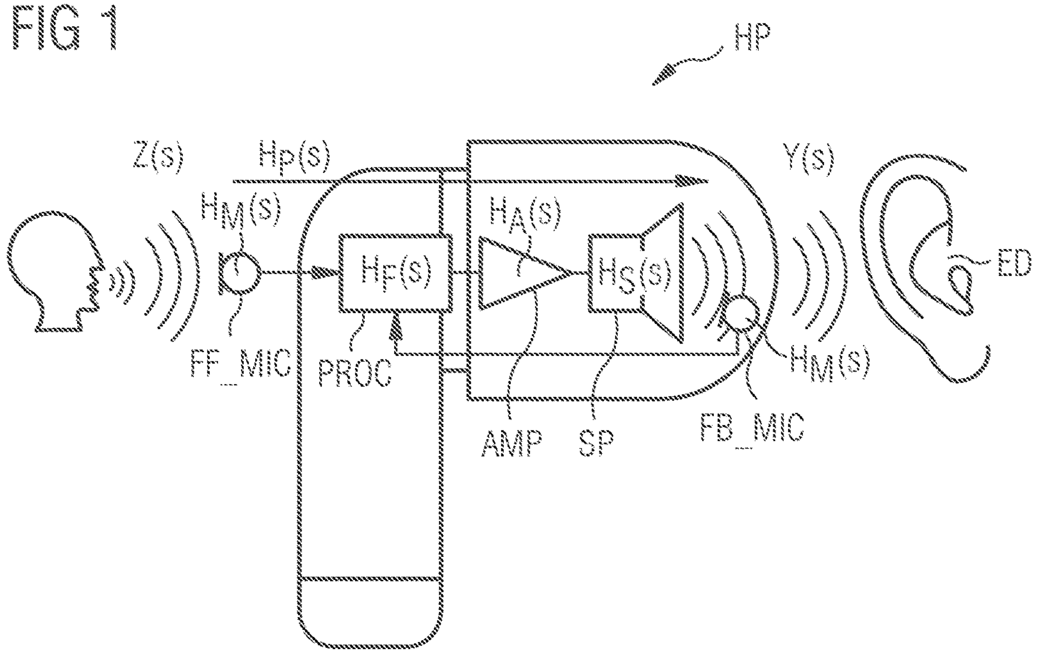

the filter transfer function (HF(s). The filter is configured to provide a system output signal (Y(s)) by filtering the input signal (Z(s)) depending on the filter function.

11 Claims, 5 Drawing Sheets

(52) U.S. Cl.
CPC ........... *H04R 25/558* (2013.01); *H04R 25/75* (2013.01); *H04R 2225/43* (2013.01); *H04R 2460/01* (2013.01)

(56) References Cited

U.S. PATENT DOCUMENTS

| | | | |
|---|---|---|---|
| 2013/0039117 | A1 | 2/2013 | Lin et al. |
| 2013/0039517 | A1 | 2/2013 | Nielsen et al. |
| 2013/0329923 | A1 | 12/2013 | Bouse |
| 2014/0126734 | A1 | 5/2014 | Gauger, Jr. et al. |
| 2015/0163608 | A1 | 6/2015 | Pontoppidan |
| 2017/0148428 | A1 | 5/2017 | Thuy et al. |
| 2018/0262854 | A1 | 9/2018 | Arnold et al. |
| 2020/0084536 | A1 | 3/2020 | Rule et al. |

FOREIGN PATENT DOCUMENTS

| | | | |
|---|---|---|---|
| EP | 2533550 | B1 | 1/2014 |
| EP | 1537759 | B1 | 7/2014 |
| EP | 3113407 | A1 | 1/2017 |
| EP | 2783522 | B1 | 7/2018 |
| WO | 2011127930 | A1 | 10/2011 |

OTHER PUBLICATIONS

Notice of Opposition dated Feb. 1, 2023, EP Application No. 19153794.3, 47 pages.

Wilson et al., "Listening to Filtered Music as a Treatment Option for Tinnitus: A Review", Music Percept., Apr. 1, 2010, vol. 27, No. 4, pp. 327-330.

Okamoto et al., "Listening to tailor-made notched music reduces tinnitus loudness and tinnitus-related auditory cortex activity", PNAS, Jan. 19, 2010, vol. 107, No. 3, pp. 1207-1210.

Pantev et al., "Music-induced cortical plasticity and lateral inhibition in the human auditory cortex as foundations for tonal tinnitus treatment", Frontiers in Systems Neuroscience, Jun. 2012, vol. 6, No. 50, pp. 1-19.

Stracke et al., "Customized notched music training reduces tinnitus loudness", Communicative & Integrative Biology 3:3, 2010, pp. 274-277.

Author Unknown, "Tinnitracks: specialist information on effectiveness", Sonormed GmbH, 2016, 10th edition (b), 54 pages (with Machine English Translation).

International Search Report and Written Opinion in corresponding Application No. PCT/EP2020/051624 dated Apr. 15, 2020, 14 pages.

Chen, Y., Chinese Office Action issued in corresponding Chinese Application No. 2020800108679 dated Jul. 12, 2023, with English language translation, 12 pages.

* cited by examiner

NOISE CANCELLATION ENABLED AUDIO SYSTEM AND METHOD FOR ADJUSTING A TARGET TRANSFER FUNCTION OF A NOISE CANCELLATION ENABLED AUDIO SYSTEM

CROSS-REFERENCE TO RELATED APPLICATIONS

The present application is the national stage entry of International Patent Application No. PCT/EP2020/051624, filed on Jan. 23, 2020, and published as WO 2020/152268 A1 on Jul. 30, 2020, which claims the benefit of priority of European Patent Application No. 19153794.3, filed on Jan. 25, 2019, all of which are incorporated by reference herein in their entirety.

The following disclosure generally relates to a noise cancellation enabled audio system and to a method for adjusting a target transfer function of a noise cancellation enabled audio system.

Nowadays people are confronted with unwanted noise almost 24 hours a day. Especially travelers are often negatively affected by high noise levels during train or subway rides, causing concentration, stress and communication problems with other people. A possible consequence of long-term noise exposure is tinnitus, which is the human perception of a sound without the presence of an acoustic stimulus. Roughly 10 to 15% of the adult population suffer from chronic tinnitus, however, only approximately 20% of them seek medical attention because the tinnitus is loud enough to affect the quality of life. Most tinnitus patients suffer from chronic subjective tinnitus, experiencing a phantom noise source caused by a malfunction in the auditory pathway. The phantom noise can have different types of sound qualities. The tonal tinnitus, which is the most common, is often described as sounding “beep”-like or “whistle”-like.

To date, there is no standard cure for tinnitus. The lack of treatment strategies is due to incomplete knowledge concerning the mechanisms of tinnitus generation and maintenance. However, recent neurophysiological findings have shown that tinnitus is presumably caused by maladaptive auditory cortex reorganization. It appears plausible to assume that the auditory cortex would principally be a treatment target, because the tinnitus perception arises here, and changes in auditory cortex could exist when tinnitus is present. Various studies have shown that neuronal populations in the auditory cortex, which code external sounds similar to the acoustic properties of the tinnitus sound, are very likely to be involved in tinnitus perception. In the case of existing tinnitus, these neuronal populations are showing hyperactivities and hyper-synchronicity and there is an unbalance between neuronal excitation and inhibition.

An attenuation effect of lateral inhibition on amplitude and synchronicity of neuronal activities can be used to suppress interfering neural activity in the human auditory cortex. Lateral inhibition is one key feature in the processing of auditory information. Each neuron has a characteristic frequency to which it is most responsive. It is surrounded by other neurons so that, together, they span a range of characteristic frequencies. The neurons in the auditory cortex are aligned based on their characteristic frequencies, in a simplified way comparable to the keys of a piano. If a neuron is excited by a stimulus, it not only passes this excitation to higher levels, it also distributes inhibition laterally to adjacent neurons with higher or lower characteristic frequencies.

Furthermore, it is known that maladaptive plastic changes are generally reversible and can be retrained to a certain degree by frequent stimulation using specifically and individually tailored auditory input. Examples from literature on human cortical plasticity indicate that the training is most effective and its effects are more persistent if the training is performed intensively and with perseverance. Based on such findings, a treatment method called “Tailor made notched music training”, TMNMT, uses tailor made music to attract lateral inhibition to auditory neurons involved in tonal tinnitus perception.

Before listening to the tailored music signal, the tinnitus patient needs to know his perceived tinnitus frequency by psycho acoustic matching. Usually, an otologist will help the patient to find out his or her personal tinnitus frequency. From the music signal, the frequency band of one octave width around the tinnitus frequency is removed, this notch filtering is usually done with a digital processor which applies the needed signal processing to the music file, generating a new version which can be played back with a common mobile phone, tablet, mp3 player or the like. The user listens to the music persistently over a longer period, using standard headphones. By doing so, the neurons with higher and lower characteristic frequencies compared to the tinnitus frequency are strongly excited and will suppress the neuronal population which are hyperactive and most likely contribute to the tinnitus noise.

Long-term studies shows that listening to such spectrally “notched” music can significantly reduce cortical activity corresponding to the notch center frequency. The study demonstrated that after a 12 month listening training (1-2 hours listening time per day via headphones) the perceived tinnitus loudness was significantly reduced for the patients in the target group. While the patient can pick any of his favorite music files there are technical requirements for the music signal which influence the TMNMT efficiency. It should contain a fair amount of energy in the affected tinnitus frequency range in order to reach a decent excitement of the neurons. Since usually the energy spectrum of music drops with higher frequency, patients with lower tinnitus frequency are better suited for TMNMT. There is a need for a more versatile solution which employs a wide frequency range yet integrates easily into everyday life in order to increase long time exposure to a training signal.

It is an objective to provide a noise cancellation enabled audio system and a method for adjusting a target transfer function of a noise cancellation enabled audio system which allow for generating of a training signal from a wide range of frequency input and increased wearability.

These objectives are achieved by the subject matter of the independent claims. Further developments and embodiments are described in dependent claims.

It is to be understood that any feature described hereinafter in relation to any one embodiment may be used alone, or in combination with other features described hereinafter, and may also be used in combination with one or more features of any other of the embodiments, or any combination of any other of the embodiments, unless explicitly described as an alternative. Furthermore, equivalents and modifications not described below may also be employed without departing from the scope of the noise cancellation enabled audio system and method for adjusting a target transfer function of a noise cancellation enabled audio system as defined in the accompanying claims.

The following relates to an improved concept in the field of noise cancellation enabled audio systems. Active noise cancelling, ANC, headphones are an effective way to reduce unwanted environmental noise, therefore reducing stress during traveling and help to protect the ears against long-term damage. The improved concept is based on an ANC system such as a headphone which is configured to actively suppress environmental noise. In addition, however, the noise cancellation enabled audio system includes a mode of operation which enables the system to realize one or more predetermined target transfer functions using the environmental noise as foundation. One possible field of application may be tinnitus treatment which uses the target transfer functions established from the environmental noise for an auditory training stimulus.

In at least one embodiment a noise cancellation enabled audio system for tonal tinnitus treatment using ambient noise comprises an audio processor and at least one filter. The at least one filter has an adjustable filter function. Furthermore, the audio system comprises an ear mountable playback device which further comprises a speaker and at least one feedforward microphone. For example, the ear mountable playback device is a headphone or headset. The audio processor is configured for playing back one or more audio signals and for performing the ANC processing. To this end, the audio processor may be equipped with a memory etc. thus forming a signal processing portion of the noise cancellation enabled audio system. The signal processing portion may be included into the headphone, for example into a housing of the headphone, or may be included in a separate housing like a dongle that is connected to the speaker housing via a cable. The signal processing portion may also be included in a mobile device, to which the playback device is connected to by a wire or wirelessly.

The audio processor is configured to receive an input signal from the feedforward microphone. This input signal is indicative of ambient noise, for example. Furthermore, the audio processor is configured to determine a filter transfer function in order to realize a predetermined target transfer function. The target transfer function is configured to attenuate or amplify the input signal in a predetermined frequency range. The predetermined target transfer function may be provided by the manufacturer of the noise cancellation enabled audio system and saved in the memory of the audio processor. However, one or more target transfer functions may also be provided or modified by the customer. In some embodiments it may be possible to set and adjust the target transfer functions in the predetermined frequency range to desired parameters. The audio processor is configured to adjust the filter function depending on the filter transfer function.

During operation, the noise cancellation enabled audio system receives ambient noise as the input signal from the feedforward microphone. Depending on the filter transfer function, the target transfer function is realized. The input signal is filtered by means of the at least one filter. In fact, the filter function of the filter is adjusted by means of the audio processor in order to realize the target transfer function. As a consequence the input signal is attenuated or amplified in the predetermined frequency range. This way a system output signal is provided by filtering the input signal depending on the filter function of the at least one filter.

The proposed noise cancellation enabled audio system uses ambient noise as a means to generate the system output signal, or training signal, from a wide range of frequency input. The surrounding environmental noise can be used as a foundation for an auditory stimulus for tinnitus treatment and may thus employ a wide range of frequencies. It is not necessary to use a tailor-made music signal, such as a notched music signal, as the source for the system output signal.

At the same time the audio system may acoustically be invisible to the user. This means that a user can communicate and interact with his environment, not influenced by the acoustic properties of the audio system. This property is supported by the possibility of using a narrow frequency range for attenuation or amplification and the possibility to compensate for the acoustic influence of the headphone itself. While wearing the audio system, a user, such as a patient, receives a tailored tinnitus training signal, i.e. the system output signal, which helps to reduce the perceived tinnitus level. As a result, the overall training time can be significantly extended, which possibly helps to achieve a more effective training and tinnitus treatment. Studies on TMNMT show that training should be employed long-term in order to maximize the training effect. Listening to music on a regular basis for about 1 to 2 hours a day can be very enjoyable, but in practice may not always be achievable for several reasons. Since the training requires listening to headphones or other audio systems, interaction with other people is usually not possible. Also, workplaces often do not allow listening to music during work. Therefore, the training usually demands the full attention of the patient, which is time-consuming enough not to be applicable in a daily routine. For some people music has no significant value, which makes it difficult for them to integrate the training into everyday life. In addition, listening for such a long time also requires a lot of different music content in order for the training to be well accepted.

In at least one embodiment the at least one filter comprises at least one notch. The predetermined target transfer function is configured to match the stop band of the notch to a tinnitus frequency to be provided to the audio processor. For example, a center frequency of the notch can be adjusted to a patient's perceived tinnitus frequency by psycho-acoustic matching. This may be done by the user or an otologist to find out the personal tinnitus frequency.

In at least one embodiment the audio processor is provided with acoustic transfer functions between an ambient sound source creating the ambient noise and an eardrum exposed to the speaker. Furthermore, the audio processor is configured to determine the filter transfer function by compensating for the acoustic transfer functions.

For example, the transfer functions are known and saved on the memory of the audio processor. The filter transfer function can be determined in real-time. However, short term changes in the acoustic transfer functions can be determined and compensated for. For example, wearing the noise cancellation enabled audio system may affect how the eardrum is exposed to the speaker. This may affect the acoustic transfer functions and the audio processor is configured to adjust for such changes. As a result, the audio processor may determine a set of filter coefficients which, in turn, can be used to adjust the filter function so that the predetermined target transfer function can be realized by the audio system. Considering the acoustic transfer functions and their possible changes supports improved listening experience.

In at least one embodiment the noise cancellation enabled audio system further comprises an amplifier which is coupled between the audio processor and the speaker. The acoustic transfer functions which are provided to the audio processor comprise a first acoustic transfer function of the feedforward microphone, denoted $H_M(s)$. A second acoustic transfer function of the amplifier is denoted $H_A(s)$. A third acoustic transfer function of the speaker is denoted $H_S(s)$. A fourth acoustic transfer function of the ear mountable playback device is denoted $H_H(s)$. The filter transfer function, denoted $H_F(s)$, is determined by $$H_F(s) = \frac{H_T(s) - H_H(s)}{H_M(s) \cdot H_A(s) \cdot H_S(s)}$$

wherein $H_T(s)$ denotes the target transfer function. The filter function can be determined by the audio processor using the equation above.

In at least one embodiment the noise cancellation enabled audio system further comprises a feedback noise microphone which is located in proximity to the speaker. Furthermore, the fourth acoustic transfer function comprises a passive damping component due to ear mountable playback device and an active damping component due to active noise cancellation by means of the feedback noise microphone. The active noise cancellation can be used to improve filter transfer function such that the target transfer function is realized so that the input signal is attenuated or amplified in the predetermined frequency range. This way the training signal can be precisely matched to a stop band of the filter to coincide with a tinnitus frequency, for example. The active damping further makes it possible to realize various other target transfer functions determined by the end-user itself.

In at least one embodiment the noise cancellation enabled audio system further comprises a control unit, e.g. having a memory to store one or more predetermined target functions. The audio processor comprises a first interface which is coupled to the control unit. The control unit comprises a second interface. One or more predetermined target transfer functions are set at the control unit, e.g. by user interaction, using the second control interface. The audio processor receives the target transfer functions via its first interface.

In at least one embodiment the control unit comprises a wireless system-on-chip and the second interface is configured to set the one or more predetermined target transfer functions at the control unit by means of wireless communication. Wireless communication provides a convenient way to use target transfer functions. The user is enabled to control, set and customize the target transfer functions, including bandwidth, number and position of center frequencies and damping of stop and pass bands. The user interaction can be initiated or controlled by an external controller, e.g. by using a dedicated mobile phone app stored on a mobile device. However, the controller may also be integrated as part of the noise cancellation enabled audio system.

In at least one embodiment the ear mountable playback device comprises several feedforward microphones which are connected to the audio processor via a beam forming unit for directional hearing. Directional hearing may support use of the noise cancellation enabled audio system as part of a hearing aid. In at least one embodiment the ear mountable playback device comprises a headphone or a hearing aid.

In at least one embodiment a method for adjusting a target transfer function of a noise cancellation enabled audio system comprises the noise cancellation enabled audio system having an audio processor and an ear mountable playback device which further comprises a speaker and at least one feedforward microphone.

The method comprises the following steps: First, using the feedforward microphone an input signal is received from the feedforward microphone. The input signal is indicative of ambient noise. Using the audio processor, a filter transfer function is determined to realize a predetermined target transfer function. The target transfer function is configured to attenuate or amplify the input signal in a predetermined frequency range. Finally, a filter function is adjusted of at least one filter of the noise cancellation enabled audio system and depends on the filter transfer function.

In at least one embodiment a system output signal is generated by filtering the input signal depending on the filter function. The system output signal can be used as a training signal, e.g. as part of tonal tinnitus treatment. For example, the filter transfer function may be set to resemble one or more notch filters. Then, the predetermined target transfer function can be configured to match a stop band of the notch, or notches, to one or more tinnitus frequencies which have been provided to the audio processor. However, application of the method is not restricted to tonal tinnitus treatment. In fact, work environments may be prone to high pitched noise of only few frequencies. Such frequencies can be cancelled out while keeping most other incoming sound intact. Thus, the method provides means to secure a person against unwanted sound in general.

In at least one embodiment a further step involves providing acoustic transfer functions between an ambient sound source which creates the ambient noise and an eardrum which is exposed to the speaker. The filter transfer function is determined by compensating for the acoustic transfer functions. The acoustic transfer functions allow for more precisely modelling the sound path of the noise cancellation enabled audio system and support improved listening experience.

In at least one embodiment the acoustic transfer functions comprise a first acoustic transfer function of the feedforward microphone and a second acoustic transfer function of an amplifier. Further acoustic transfer functions comprise a third acoustic transfer function of the speaker and a fourth acoustic transfer function of the ear mountable playback device. The filter transfer function is determined by $$H_F(s) = \frac{H_T(s) - H_H(s)}{H_M(s) \cdot H_A(s) \cdot H_S(s)}$$

wherein $H_T(s)$ denotes the target transfer function. The filter function can be determined by the audio processor using the equation above.

In at least one embodiment the fourth acoustic transfer function is provided with a passive damping component due to the ear mountable playback device and an active damping component due to active noise cancellation by means of the feedback noise microphone. The active noise cancellation can be used to improve filter transfer function such that the target transfer function is realized so that the input signal is attenuated or amplified in the predetermined frequency range. This way the training signal can be precisely matched to a stop band of the filter to coincide with a tinnitus frequency, for example.

In at least one embodiment the predetermined target transfer function is provided out of one or more predetermined target transfer functions by user interaction. In at least one embodiment the user interaction involves wireless communication of the one or more predetermined target transfer functions to the audio processor.

Further implementations of the noise cancellation enabled audio system for tonal tinnitus treatment using ambient noise are readily derived from the various implementations and embodiments of the method for adjusting a target transfer function of a noise cancellation enabled audio system and vice versa.

In the following, the concept presented above is described in further detail with respect to drawings, in which exemplary embodiments are presented.

In the examples of embodiments and Figures below, similar or identical elements may each be provided with the same reference numerals. The elements illustrated in the drawings and their size relationships among one another, however, should not be regarded as true to scale. Rather individual elements, such as layers, components, and regions, may be exaggerated to enable better illustration or improved understanding.

Figure 2:
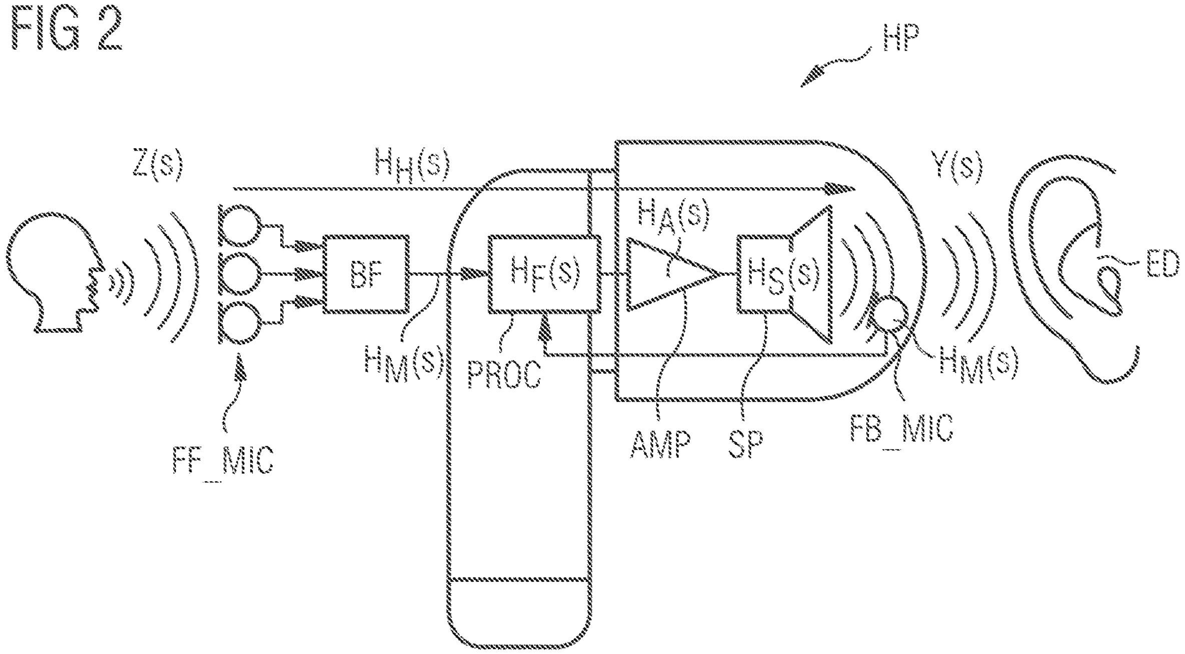
Figure 3:
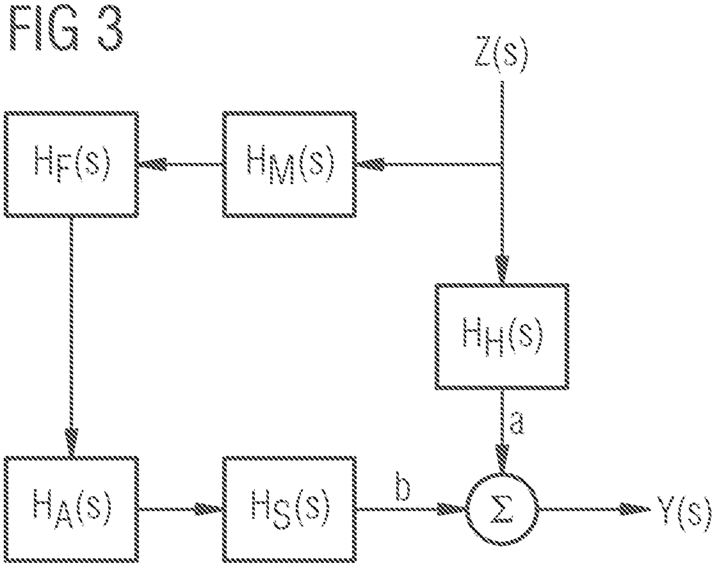
Figure 4:
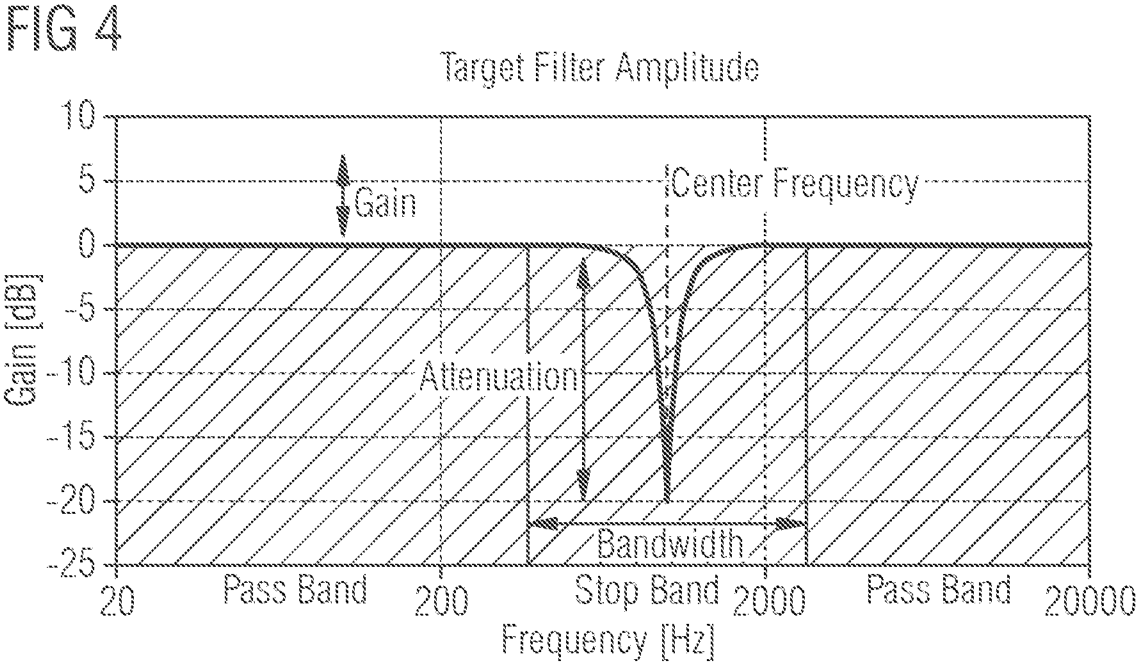
Figure 5:
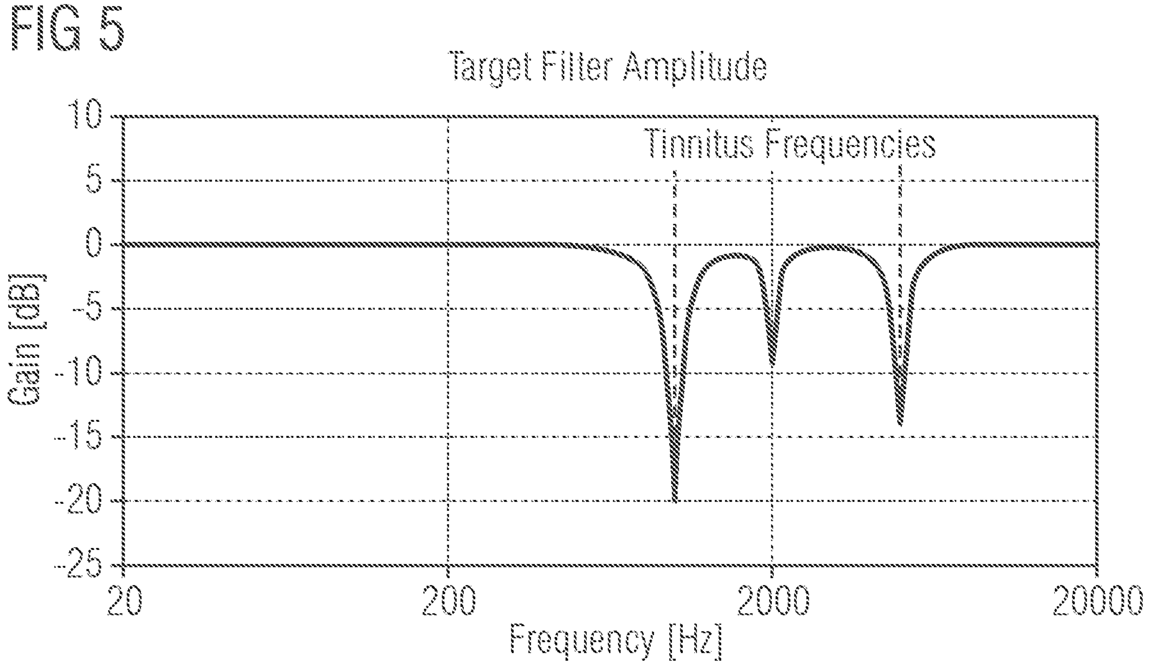
Figure 6A:
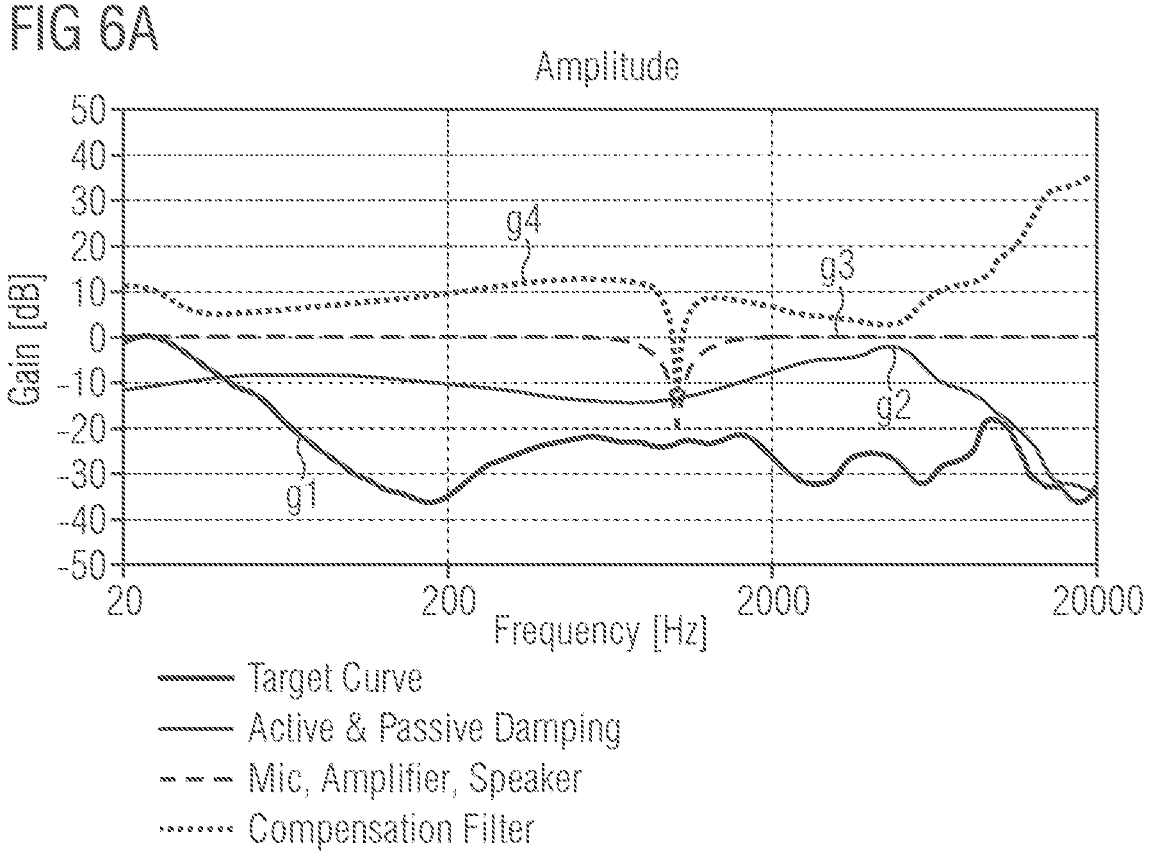
Figure 6B:
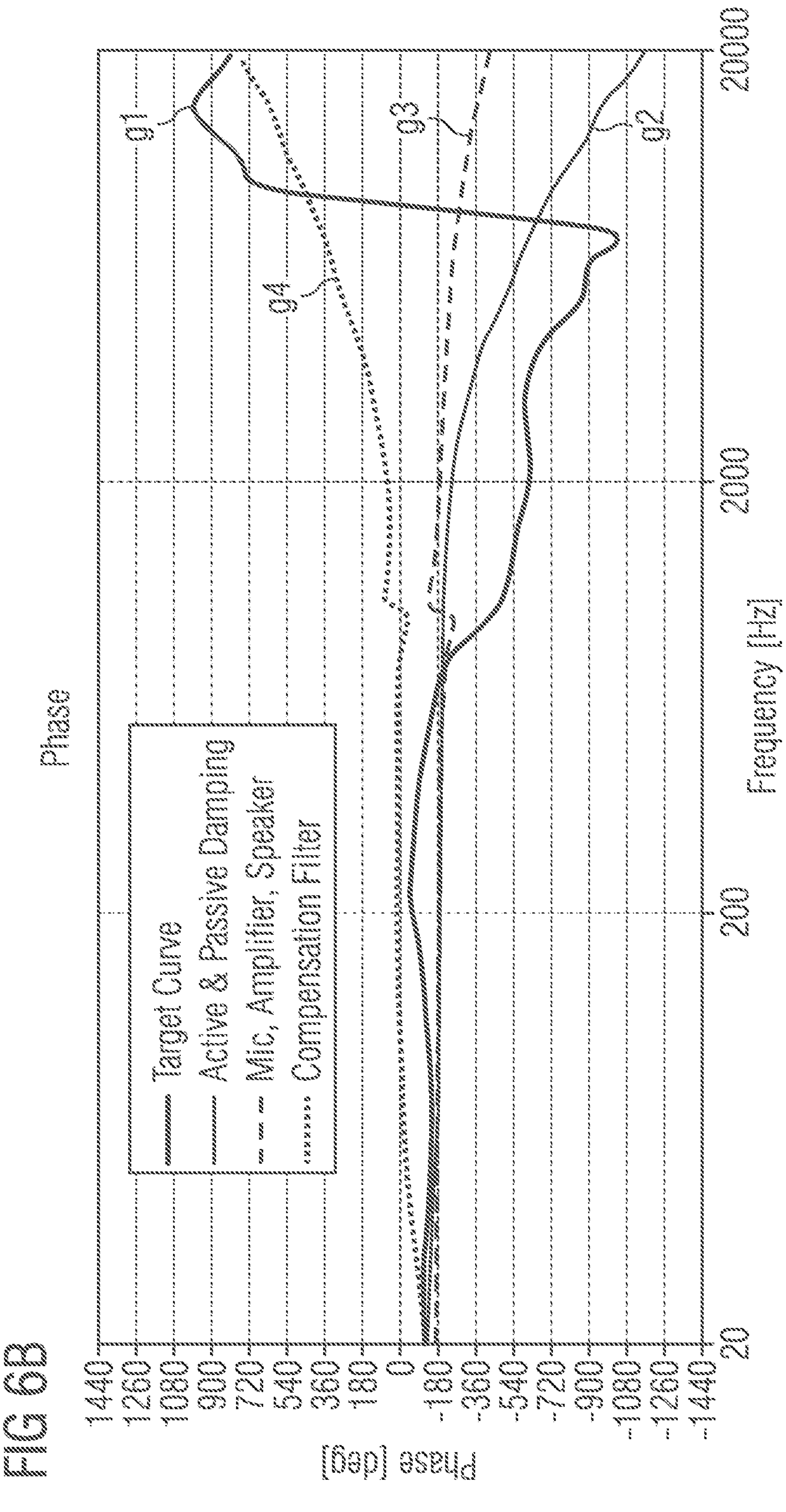
Figure 7:
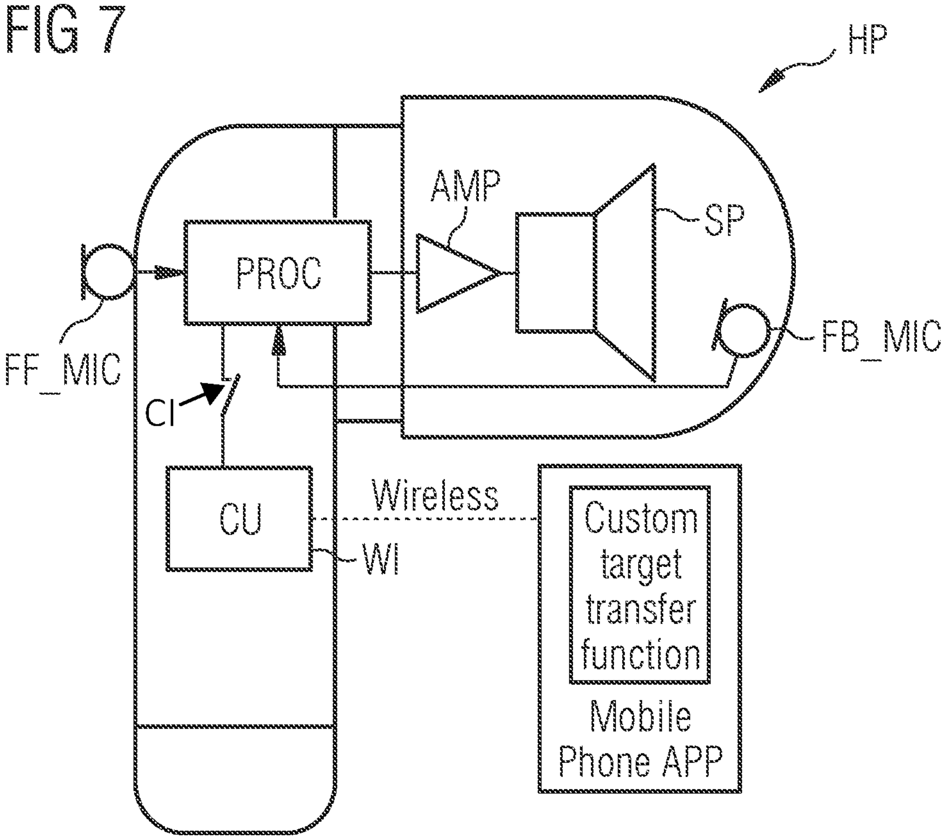

FIG. 1 shows an example configuration of a headphone HP worn by a user with several sound paths, FIG. 2 shows an example configuration of a headphone HP worn by a user with several sound paths, FIG. 3 shows an example configuration of signal paths of the noise cancellation enabled audio system, FIG. 4 shows an example of a predetermined target transfer function, FIG. 5 shows another example of a predetermined target transfer function, FIGS. 6A and 6B show examples of acoustic transfer functions, and FIG. 7 shows another example configuration of a headphone HP worn by a user.

A noise cancellation enabled audio system comprises one or more microphones located on an outside of a headphone and a speaker located near the user's ear, for example. The audio system can be operated in an ANC mode of operation. In the ANC mode the audio system attenuates ambient sound by measuring the ambient noise before it enters the ear, and processing that signal so that the acoustical signal leaving its speaker is equal and opposite to the ambient noise entering the ear, thus interfering destructively. In a training mode of operation, however, the audio system uses the ambient noise to generate a training signal out of the environmental surrounding sound. The needed signal generation is done in a dedicated signal processor, placed inside or outside the headphone and will be discussed in the following.

FIG. 1 shows an example configuration of a headphone HP worn by a user with several sound paths. The headphone HP shown in FIG. 1 stands as an example for any ear mountable playback device of a noise cancellation enabled audio system and can e.g. include in-ear headphones or earphones, on-ear headphones or over-ear headphones. Instead of a headphone, the ear mountable playback device could also be a mobile phone or a similar device. Furthermore, the ear mountable playback device could also be a hearing aid or a part thereof.

The headphone HP in this example features a loudspeaker SP, a feedforward microphone FF_MIC and, optionally, a feedback microphone FB_MIC. Internal processing details of the headphone HP are not shown here for reasons of a better overview. Furthermore, the headphone HP comprises an audio processor PROC, a filter having an adjustable filter function (not shown) and an amplifier AMP which establish a processing path coupled to the loudspeaker SP. The feedback microphone FB_MIC is coupled to the audio processor PROC by means of a feedback path.

Any specific details on processing of the microphone signals or any signal transmission are left out in FIG. 1 for reasons of a better overview. However, processing of the microphone signals in order to perform ANC may be implemented in the audio processor PROC located within the headphone or other ear-mountable playback device or externally from the headphone in a dedicated processing unit. If the processing unit is integrated into the playback device, the playback device itself forms a noise cancellation enabled audio system. If processing is performed externally, the external device or processor together with the playback device forms the noise cancellation enabled audio system. For example, processing may be performed in a mobile device like a mobile phone or a mobile audio player, to which the headphone is connected with or without wires.

The various components of the noise cancellation enabled audio system define several sound paths. The sound paths can be represented by a respective acoustic response function or acoustic transfer function. A first acoustic transfer function HM(s) is indicative of the feedforward microphone FF_MIC and denoted $H_M(s)$. A second acoustic transfer function HA(s) is indicative of the amplifier AMP and denoted $H_A(s)$. A third acoustic transfer function HS(s) is indicative of the speaker (SP) and denoted $H_S(s)$. Finally, a fourth acoustic transfer function HH(s) is indicative of the ear mountable playback device HP and denoted $H_H(s)$. The fourth acoustic transfer function HH(s) has an active component and a passive component which account for active and passive damping, respectively.

Audio signals are processed by the audio processor PROC and output via the speaker SP. The audio processor PROC may feature a first interface CI, over which processing parameters or operating modes of the audio processor PROC can be set. Furthermore, the first interface CI can be configured to input a target transfer function HT(s), denoted $H_T(s)$ hereinafter. In some implementations, the audio processor PROC may be implemented as an ARM microprocessor, e.g. with a programmable firmware. For example, one or more target transfer functions HT(s) can be changed or adjusted via the first interface CI as will be described below in more detail.

FIG. 2 shows an example configuration of a headphone HP worn by a user with several sound paths. This example is a modification of the example discussed in FIG. 1. The ear mountable playback device, e.g. headphone HP, comprises several feedforward microphones FF_MIC which are connected to the audio processor PROC via a beam forming unit. The beam forming unit provides for directional hearing. For example, in case the ear mountable playback device is implemented as part of a hearing aid, directional hearing may be supported in this way.

FIG. 3 shows an example configuration of signal paths of the noise cancellation enabled audio system. The flow chart indicates the acoustic transfer function introduced above. An input signal Z(s) represents external or ambient noise. The audio system is configured to output the system output signal Y(s). For example, the system output signal Y(s) can be used as a training signal in tonal tinnitus treatment. The headphone transfer function, i.e. fourth acoustic transfer function HH(s), includes the passive damping component HP(s) and the active damping component HANC of the headphone HP, as well as acoustic reflections inside the headphone. The first acoustic transfer function HM(s) represents the transfer function of the noise microphone with or without the beam former unit. The second acoustic transfer function HA(s) represents the transfer function of the amplifier. The third acoustic transfer function HS(s) includes the transfer function of the loudspeaker as well as the reflections inside the headphone. A filter transfer function HF(s), denoted $H_F(s)$ represents a signal processor transfer function and is adjustable. The filter transfer function is calculated with the help of the following formulas. The calculation is executed by the audio processor, for example.

A goal is to realize a given, predetermined target transfer function HT(s) from the input to the output:

$$\frac{Y(s)}{Z(s)} \equiv H_T(s),$$

wherein Z(s) denotes the input signal and Y(s) the system output signal. Let the system output the system output signal Y(s) be:

$$Y(s)=a+b,$$

with partial signal $$a=Z(s)\cdot H_H(S)$$

and partial signal $$b=Z(S)\cdot H_M(s)\cdot H_F(S)\cdot H_A(S)\cdot H_S(s).$$

The terms a and b can be combined to yield:

$$Y(s)=Z(s)(H_H(s)+H_M(s)\cdot H_F(s)\cdot H_A(s)\cdot H_S(s)).$$

As a result the target transfer function HT(s) can be expressed as:

$$\frac{Y(s)}{Z(s)} = H_H(s) + H_M(s)\cdot H_F(s)\cdot H_S(s) \equiv H_T(s).$$

This equation is solved using the filter transfer function HF(s):

$$H_F(s) = \frac{H_T(s) - H_H(s)}{H_M(s)\cdot H_F(s)\cdot H_A(s)\cdot H_S(s)}$$

In other words, the audio processor PROC determines the filter transfer function HF(s) by compensating the target transfer function HT(s) for the acoustic transfer functions of the audio system. For example, as a result of this calculation the audio processor PROC outputs or adjusts the filter function FF. For example, the filter function FF is implemented by a set of filter coefficients which are determined and output by the audio processor PROC. The filter may be implemented as one or more filter banks which can be adjusted using the filter coefficients. This way the filter function FF can be established to reproduce the filter transfer function HF(s). The filter function FF realizes the target transfer function HT(s) and compensates for the acoustic transfer functions including the active and passive attenuation components, the microphone, amplifier and the speaker. Finally, the system output signal Y(s) is generated by filtering the input signal Z(s) using the filter being adjusted according to the filter function FF.

The filter may be part of the audio processor PROC or a separate component of the headphone HP. One aspect to consider relates to overall signal latency. As discussed above the partial signal a is mixed together with the partial signal b. However, partial signal b is processed by the audio processor and other components. Thus, the latency of the signal chain which is creating partial signal b should be low in order to avoid unwanted effects like comb filtering or audible echoes. Usually, the audio processor contributes the main part of the overall system latency. It has been found that latency should not exceed 30 μs of propagation delay.

FIG. 4 shows an example of a predetermined target transfer function. The amplitude of the target transfer function is depicted in units of gain [dB] over frequency [Hz]. In this example, the target transfer function is a notch filter having a center frequency and characteristic bandwidth. For tinnitus treatment the stop band is matching the tinnitus frequency which is set at the audio processor. The bandwidth of the stop band is usually one octave, but can be adjusted to fit the bandwidth of the tinnitus noise. Also the amount of damping or negative gain in the stop band is adjustable. In the pass band(s), the gain of the transfer function is usually constant or close to 0 dB, but can also be increased by the user to amplify the environmental noise. User interaction will be discussed in further detail below.

FIG. 5 shows another example of a predetermined target transfer function. The amplitude of the target transfer function is depicted in units of gain [dB] over frequency [Hz]. In this example, the target transfer function is a multi-notch filter having three center frequencies, each having a characteristic bandwidth. In case the user is experiencing several tones with different frequencies instead of a single tinnitus tone, it is possible to add additional notch filters, such as the three notches in this example. The respective properties such as bandwidth, center frequencies and damping of stop and pass bands are adjustable by user interaction.

FIGS. 6A and 6B show examples of acoustic transfer functions. The drawing in FIG. 6A shows the amplitude and the drawing in FIG. 6B shows a phase response of a typical headphone HP. The graphs are depicted in units of gain [dB] over frequency [Hz]. A first graph g1 represents the active and passive damping of the ANC headphone, e.g. the fourth acoustic transfer function HH(s) of the ear mountable playback device HP. The transfer functions of the microphone, the amplifier, the speaker and the reflections inside the headphone are combined into graph g2 to simplify the drawing. Another graph g3 represents the target transfer function HT(s), as an example with a single notch frequency of 1 kHz.

Graph g4 represents the filter transfer function HF(s). As discussed above the filter transfer function HF(s) is calculated by the audio processor PROC. Comparing the filter transfer function HF(s) and the target transfer function HT(s) shows the compensation of the target transfer function HT(s) for the acoustic transfer functions of the audio system. In a similar manner the compensation is also reflected in FIG. 6B wherein the graphs g1 to show the phase in units of gain [dB] over frequency [Hz] of the same acoustic transfer functions, respectively.

FIG. 7 shows another example configuration of a headphone HP worn by a user. This example is a modification of the examples discussed in FIG. 1 or 2. In addition, the headphone comprises a control unit CU to store one or more predetermined target transfer functions. The audio processor PROC is connected to the control unit CU via the first interface CI. This way the audio processor PROC can receive target transfer functions HT(s) from the control unit CU. The audio processor is controllable by the first interface CI, e.g. a serial interface like $I^2C$ or SPI.

The control unit CU comprises a wireless system-on-chip such as a Bluetooth or Wi-Fi chip. A second interface WI is configured to receive target transfer functions HT(s) at the control unit CU by wireless communication. The wireless connection using the second interface WI enables the user to control, set and customize the target transfer functions, including bandwidth, number and position of center frequencies and damping of stop and pass bands. The user interaction can be initiated or controlled by an external controller CL, e.g. by using a dedicated mobile phone App stored on a mobile device, as shown in FIG. 7. However, the controller CL may also be integrated as part of the headphone HP or noise cancellation enabled audio system in general.

In addition, it is also possible to realize other target transfer functions which are freely selectable by the user, e.g. via wireless communication. It is for example possible to amplify certain frequencies, e.g. for better speech intelligibility during a conversation or to compensate for hearing losses in certain frequency areas, e.g. in hearing aid applications. Once the user has selected a preferred target function, the audio processor PROC automatically generates the corresponding filter transfer function HF(s), and realizes this function by adjusting the filter based on the calculations shown above.

The noise cancellation enabled audio systems suggested above combine a feed-back active noise cancellation system and a method to generate a training signal out of the environmental surrounding noise. The feedback system eases the design of the notch filter, makes it more effective, e.g. more damping achievable, and helps to enlarge the usable frequency range. One possible field of application relates to using the training signal in tinnitus treatment. The audio systems and method does not rely on music signals as a source for the training signals. Instead environmental noise can be used as a stimulus for tinnitus treatment based on the notched frequency method, for example. This is made possible by including active noise cancellation and by considering the involved acoustic transfer functions like passive damping, microphone or speaker response. This reduces design constraints of the filter and leads to a satisfying listening impression for the user.

At the same time, the audio systems allow the headphone to be acoustically invisible to the user, which means the user can communicate and interact with the environment, not influenced by the acoustic properties of the headphone. It enables to the user to wear the headphone and receive the tinnitus treatment over a very long time, for example. This helps to make tinnitus treatment training more effective and applicable to a larger number of patients. It enables patients to treat their tinnitus during their daily routine, which extends the possible treatment time tremendously. The treatment routine is not dependent on any processed music files, which are usually mandatory and selected by the user before starting a new therapy session.

The invention claimed is:

1. A noise cancellation enabled audio system for tonal tinnitus treatment using ambient noise, comprising:

an audio processor, at least one filter having an adjustable filter function, an ear mountable playback device further comprising a speaker and at least one feedforward microphone, and an amplifier coupled between the audio processor and the speaker, wherein the audio processor is configured to:

receive an input signal from the feedforward microphone indicative of ambient noise, determine a filter transfer function to realize a predetermined target transfer function, wherein the target transfer function is configured to attenuate and/or amplify the input signal in a predetermined frequency range, and adjusting the filter function depending on the filter transfer function; and wherein the filter is configured to:

provide a system output signal by filtering the input signal depending on the filter function, and, wherein:

the audio processor is provided with acoustic transfer functions between an ambient sound source creating the ambient noise and an eardrum exposed to the speaker, and the audio processor is configured to determine the filter transfer function by compensating for the acoustic transfer functions, and wherein the acoustic transfer functions comprise:

a first acoustic transfer function of the feedforward microphone, denoted $H_M(s)$, a second acoustic transfer function of the amplifier, denoted $H_A(s)$, a third acoustic transfer function of the speaker, denoted $H_S(s)$, a fourth acoustic transfer function of the ear mountable playback device, denoted $H_H(s)$; and wherein:

the filter transfer function, denoted $H_F(s)$, is determined as $$H_F(s) = \frac{H_T(s) - H_H(s)}{H_M(s) \cdot H_A(s) \cdot H_S(s)}$$

wherein HT(s) denotes the target transfer function.

2. The noise cancellation enabled audio system according to claim 1, wherein:

the filter comprises at least one notch, and wherein the predetermined target transfer function is configured to match a stop band of the notch to a tinnitus frequency to be provided to the audio processor.

3. The noise cancellation enabled audio system according to claim 1, further comprising a feedback noise microphone located in proximity to the speaker, and wherein the fourth acoustic transfer function comprises a passive damping component due to the ear mountable playback device and an active damping component due to active noise cancellation by means of the feedback noise microphone.

4. The noise cancellation enabled audio system according to claim 1, further comprising:

a control unit configured to store one or more predetermined target transfer functions; and wherein:

the audio processor comprises a first interface coupled to the control unit to receive the one or more predetermined target transfer functions from the control unit, and the control unit comprises a second interface to set the one or more predetermined target transfer functions at the control unit.

5. The noise cancellation enabled audio system according to claim 4, wherein the control unit comprises a wireless system-on-chip and the second interface is configured to set the one or more predetermined target transfer functions at the control unit by wireless communication.

6. The noise cancellation enabled audio system according to claim 1, wherein the ear mountable playback device comprises several feedforward microphones connected to the audio processor via a beam forming unit for directional hearing.

7. The noise cancellation enabled audio system according to claim 1, wherein the ear mountable playback device comprises a headphone or a hearing aid.

8. A method for adjusting a target transfer function of a noise cancellation enabled audio system comprising an audio processor and an ear mountable playback device further comprising a speaker and at least one feedforward microphone, the method comprising:

receiving using the feedforward microphone an input signal from a feedforward microphone, the input signal being indicative of ambient noise, and, using the audio processor:

determining a filter transfer function to realize a predetermined target transfer function, wherein the target transfer function is configured to attenuate and/or amplify the input signal in a predetermined frequency range, adjusting a filter function of at least one filter of the noise cancellation enabled audio system depending on the filter transfer function, providing acoustic transfer functions between an ambient sound source creating the ambient noise and an eardrum exposed to the speaker, and determining the filter transfer function by compensating for the acoustic transfer functions, and wherein the acoustic transfer functions comprise:

a first acoustic transfer function of the feedforward microphone, denoted H_M(s), a second acoustic transfer function of an amplifier, denoted H_A(s), a third acoustic transfer function of the speaker, denoted H_S(s), a fourth acoustic transfer function of the ear mountable playback device, denoted H_H(s); and wherein:

the filter transfer function, denoted H_F(s), is determined as $$H_F(s) = \frac{H_T(s) - H_H(s)}{H_M(s) \cdot H_A(s) \cdot H_S(s)}$$

wherein H_T(s) denotes the target transfer function.

9. The method according to claim 8, wherein the fourth acoustic transfer function is provided with a passive damping component due to the ear mountable playback device and an active damping component due to active noise cancellation using the feedback noise microphone.

10. The method according to claim 8, wherein the predetermined target transfer function is provided out of one or more predetermined target transfer functions by user interaction.

11. The method according to claim 10, wherein the user interaction involves wireless communication of the one or more predetermined target transfer functions to the audio processor.

* * * * *